United States Patent [19]

Bradley, Jr. et al.

[11] Patent Number: 4,767,186
[45] Date of Patent: Aug. 30, 1988

[54] FRONT PROJECTION SCREEN WITH REAR LIGHT CONCENTRATING LENS ARRAY

[75] Inventors: Ralph H. Bradley, Jr., Kingsport; William F. Guerinot, Knoxville, both of Tenn.

[73] Assignee: North American Philips Consumer Electronics Corp., New York, N.Y.

[21] Appl. No.: 107,087

[22] Filed: Oct. 6, 1987

[51] Int. Cl.⁴ .............................................. G03B 21/60
[52] U.S. Cl. .................................................... 350/128
[58] Field of Search ................................. 350/127–129

[56] References Cited

U.S. PATENT DOCUMENTS 3,57,900  6/1966  Goodbar et al. ..................... 350/129
1,942,841  1/1934  Shimizu ................................ 350/128
2,738,706  3/1956  Thompson, Jr. ................. 350/128 X
3,180,214  4/1965  Fox .................................. 350/129 X
3,218,924  10/1965  Miller ................................. 350/129
3,704,055  11/1972  Hong ................................. 350/128
4,298,246  11/1981  Iwamura ........................ 350/129 X
4,606,609  8/1986  Hong ................................. 350/128

Primary Examiner—Richard A. Wintercorn
Attorney, Agent, or Firm—John C. Fox

[57] ABSTRACT

LCD color television front projection screen has a rear vertically oriented lenticular lens array, the sidewalls of the lenticules steeply inclined to achieve total internal reflection of rays from a projected image into tip regions of the lenticules, an external reflective surface behind the array for reflecting the projected rays back into an audience field in front of the screen, and black masking between the lenticules for absorbing ambient rays.

23 Claims, 3 Drawing Sheets

FRONT PROJECTION SCREEN WITH REAR LIGHT CONCENTRATING LENS ARRAY

BACKGROUND OF THE INVENTION

This invention relates to a front projection screen for use in displaying an image projected from an image source. More particularly, the invention relates to a front projection screen employing a light concentrating lens array and light-reflecting and absorbing elements behind the array, the lens array concentrating projected light from an image source onto the reflecting elements, the reflecting elements distributing the light back in to an audience field, and the absorbing elements trapping ambient light.

Front projection screens are useful in a variety of applications, for example, television, motion picture and other video and film media displays. In such applications, an image source in front of the screen projects an image forward along a central projection axis to the screen, which displays the image to viewers in an audience field, also located in front of the screen.

A problem encountered in these front projection systems is that the image contrast is often reduced by the presence of ambient light. This is particularly troublesome in those applications in which a dedicated projection room is not practical, for example, projection television for the consumer market. In such cases, the source and character of ambient lighting is generally unpredictable and thus uncontrollable.

It is known to increase the image contrast of front projection screens by concentrating the projected light into a multiplicity of picture elements, or "pixels", and by providing an array of reflective areas on a rear surface of the screen to reflect the pixels back through the front surface and into the audience space. Ambient light which enters the screen at oblique angles to the projection axis generally falls on light absorbing areas surrounding the light reflecting areas, and is consequently absorbed. See U.S. Pat. Nos. 1,942,841; 4,298,246; 3,704,055; and 4,606,609.

In U.S. Pat. Nos. 4,298,246 and 1,942,841, the front surface is made up of a two-dimensional array of convex lenslets which focus the projected image behind the reflecting areas of the rear surface of the screen, resulting in some spreading of the image as it is reflected back into the audience field.

In U.S. Pat. Nos. 4,606,609 and 3,704,055, the screen is made up of a plurality of optical cells, each having a front convex lens surface, and a rear surface contoured to collimate the reflected light into a narrow beam. Spreading of the image is accomplished by light diffusing areas on the front lens surfaces located in the path of the reflected light, which diffuse the beams into the audience field.

In all of the above arrangements, optimum performance is dependent upon holding a relatively close tolerance on screen thickness, as well as the registration between the front and back surfaces, both needed to insure that the focal points of the front surface lenses fall at the desired location relative to the rear reflecting surface.

In addition, these arrangements are designed with the assumption that the projected light is parallel to the projection axis and thus normally incident on the screen surface. For a flat screen, this is generally true only in a central portion of the screen near the projection axis. With increasing distance away from the projection axis, the angle of incidence of the projected light increases, increasing the likelihood that the pixels will be partly or totally intercepted by the light absorbing areas.

In U.S. Pat. No. 3,704,055, it is suggested that this problem be solved by inclining the optical cells so that their optic axes are coincident with the projected rays, for example, by spherically contouring the screen. However, such contouring has been found in practice to be a difficult task, tending to frustrate economical mass production of these screens.

An alternative to spherically contouring the screen would be to provide a circular Fresnel lens in front of the screen to collimate the projected light so that it is normally incident on the light concentrating lens surfaces. However, the presence of such an additional lens would not only reduce screen efficiency, primarily through increased reflection losses, but also would decrease screen contrast, through increased reflection of ambient light, as well as increase the structural complexity of the screen, adding to fabrication costs. Thus, Fresnel lenses, while widely used in rear projection screens, have not been commercially used in front projection screens.

Accordingly, it is an object of the invention to provide a front projection screen of the type which concentrates projected light onto an array of light reflecting areas bordered by light absorbing areas for image contrast, which screen does not rely upon a front surface array of lenses to concentrate the light.

It is another object of the invention to provide such a front projection screen which does not rely for optimum performance upon control of screen thickness and registration between arrays on the front and back surfaces of the screen.

It is still another object of the invention to provide such a front projection screen having a single transmissive layer with a front surface available for a light collimating or other lens element.

It is still another object of the invention to provide such a front projection screen which can be readily mass-produced.

SUMMARY OF THE INVENTION

In accordance with the invention, a front projection screen includes a rear-facing, vertically oriented lenticular lens array, each lenticule of the array having a tip portion, and steep sidewall portions shaped to concentrate incoming light by total internal reflection into the tip portion, and external reflective means adjacent to at least the tip portions of the array for reflecting the concentrated light back through the array and into an audience field. In addition, light absorbing means is present between the reflective means for absorbing ambient light.

Horizontal spreading of light into the audience field is accomplished primarily by total internal reflection of the externally reflected light rays by the side walls of the lenticules, and refraction of the light rays at the front surface of the screen.

Light absorbing means may be black masking in the form of filaments, particles or coatings located in the grooves or spaces between the lenticules.

The external reflective means may be a mirror surface formed by applying a reflective coating to plastic (e.g. acrylic), or glass, or may be a metallized film (e.g. polyester) with the reflecting surface being on either the front or rear surface, or the reflecting layer may be applied directly to the tips of the lenticules. The latter can be readily accomplished if black masking has been provided which blocks the mirrorizing of the sides of the lenticules.

The front surface of the screen may be coated to reduce reflections or the surface may have a special texture which reduces reflections. In addition, another lens element such as a light collimating Fresnel lens or a light spreading lenticular lens array may be present on the front surface of the screen.

Diffusion means may also be present in the screen in order to contribute to the distribution of light into the audience field, particularly in the vertical direction.

In accordance with a preferred embodiment of the invention, each lenticule of the lenticular lens array has a height-to-base width ratio of from about 1:2 to 6:1, and a base width-to-tip width ratio of from about 2:1 to 20:1.

DESCRIPTION OF THE PREFERRED EMBODIMENT

Figure 1:
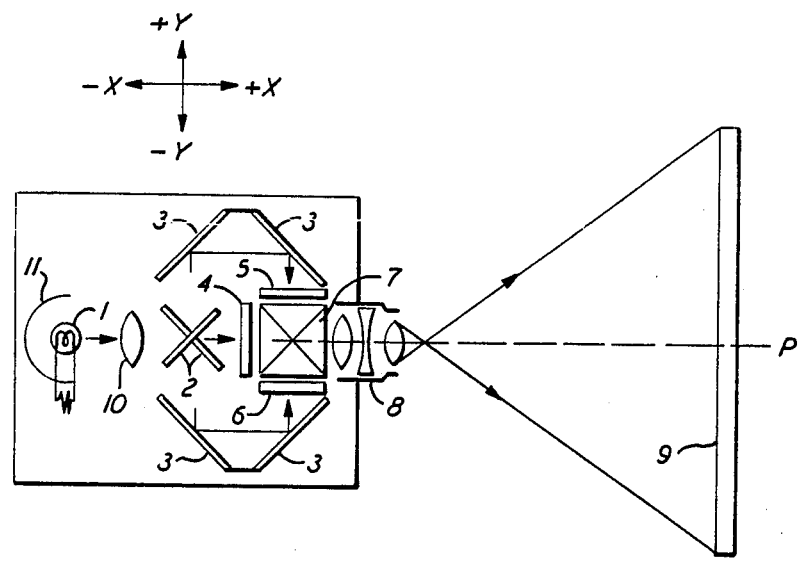
FIG. 1 is a perspective view of a front projection liquid crystal display (LCD) color television system employing a front projection screen.

An LCD color television projection system employing a front projection screen is illustrated in FIG. 1. In this prior art arrangement, light from a tungsten halogen lamp 1 is variously transmitted and reflected through a crossed pair of dichroic mirrors 2 and adjacent mirrors 3 to pass through three liquid crystal displays 4, 5 and 6. These three LCDs modulate three channels to create the red, green, and blue portions of a TV picture. The dichroic mirrors 2 break the white light source 1 into red, blue, and green portions of the spectrum. These three color portions are then recombined by way of a dichroic prism 7. The recombined light is projected by way of a projection lens 8 along a projection axis P to a projection screen 9.

This arrangement also includes a condenser arrangement consisting of a condenser lens 10 and reflector 11. The condenser lens 10 is designed for maximum collection efficiency to collect light emitted in the $+X$ direction. The spherical reflector 11 collects light emitted in the $-X$ direction and images the light of the lamp back onto itself.

Figure 2:
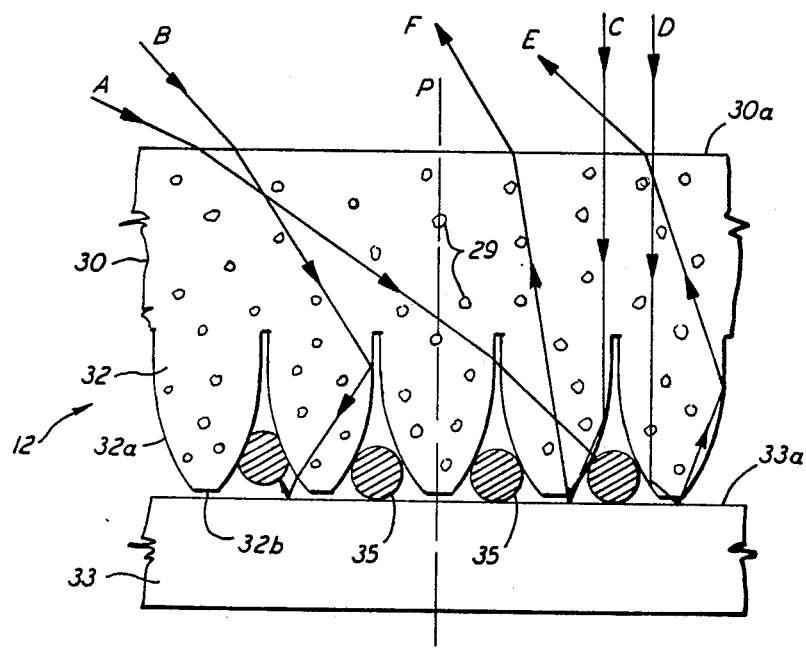
FIG. 2 is a horizontal cross-section view showing a portion of one embodiment of the front projection screen of the invention.

FIG. 2 is a horizontal cross-section view, illustrating one embodiment of a projection screen 12 in accordance with the invention. Light transmissive layer 30 has a front planar surface 30a and a rear surface defined by an array of vertically oriented lenticules 32, each lenticule having steeply inclined sidewall portions 32a and a tip portion 32b. Adjacent this array is a layer 33 having a light reflective surface 33a in close proximity to the tip portions 32b of the lenticules 32. Alternatively, reflective surface 33a may be optically coupled to the array. For example, an adhesive can be used to fix the reflective surface against the tip. If the adhesive is optically transmissive, and if it has a refractive index approximately equal to the medium of the transmissive sheet, then optically coupling will be realized. Black masking is in the form of light absorbing filaments 35, located in the grooves between the lenticules 32.

In operation, light rays, designated A through D, from both the projected image and from ambient sources enter layer 30, and are refracted in accordance with Snell's Law. Light rays A and B, representative of ambient light, enter at oblique angles of incidence with respect to the projection axis P. Ray A strikes a lenticule sidewall with an incident angle too small for total internal reflection, and thus is transmitted and absorbed by a filament 35. Ray B strikes a lenticule at an incident angle large enough for total internal reflection, but too small to be transmitted to the tip portion of the lenticule. Ray B is thus transmitted through the adjacent sidewall, reflected from surface 33a and absorbed by a filament 35.

Rays C and D, representative of light from the projected image, enter layer 30 along the projection axis P. Consequently, these rays strike the sidewalls of the lenticules at relatively large angles of incidence, and are totally internally reflected to the tip portions of the respective lenticules, where they are transmitted to reflective surface 33a and reflected back as Rays E and F into layer 30 and thence refracted into the audience field.

Diffusion means in the form of light scattering particles 29 may be present to aid in the spreading of light into the audience field, particularly in the vertical direction.

Figure 3:
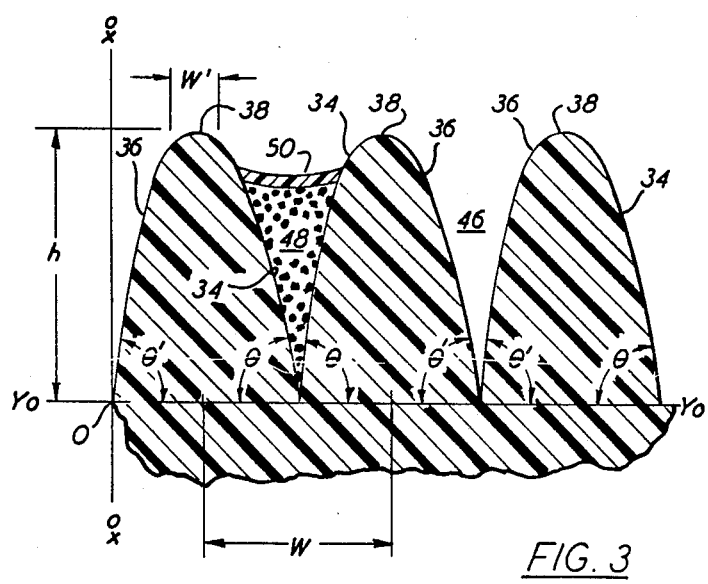
FIG. 3 is a cross-section view similar to that of FIG. 2 showing a portion of a preferred embodiment of the screen.

FIG. 3 is a cross-section of three lenticular lens elements, each having side surfaces 34 and 36 and an upper tip surface 38. The side surfaces 34 and 36 may be linear, but are preferably convexed outward, and have an average slope $\phi$ and $\phi'$ selected to establish a degree of internal reflection desired to direct light from a projection source to the tip surface 38.

Usually, the sides 34 and 36 will be mirror images, i.e., the lenticules will be symmetrical. In such case, $\phi = \phi'$. Also known in the screen art is the use of lenticules which are not symmetrical. In this case, the distribution of light horizontally can still be symmetrical if adjacent lenticules are reversed, so that $\phi$ and $\phi'$ are reversed, as shown in the figure. Other arrangements to provide a desired distribution of light are also possible.

In a preferred embodiment, the ratio of the base width W of the lenticules to the width W' of the upper tip surface 38 is in the range of from about 2:1 to 20:1, and preferably at least 3:1. The ratio of the lenticule height h to the base width W is in the range of from about 1:2 to 6:1, and is preferably at least 2:3.

Ratios of height to base width larger than 6:1 are possible, but are not necessary. Ratios of height to base width smaller than 1:2 have reduced efficiency. Ratios of base width to tip width smaller than 2:1 have poorer rejection of ambient light because a large percentage of the rear surface must have a reflective means; else the efficiency is reduced. Ratios of base width to tip width greater than 20:1 have light concentrated to such a small area that providing sufficient accuracy to the side wall shape becomes a problem.

In setting the ratio of base width W of the lenticules to the width W' of the upper tip surface 38, and the ratio of the lenticule height h to the base width W, the refractive index of the light transmissive layer should be taken into account. For the preferred material, polymethylmetharcrylate, the refractive index is about 1.5. For other practical materials, this value will not change sufficiently to invalidate the stated ranges of ratios.

Figure 4:
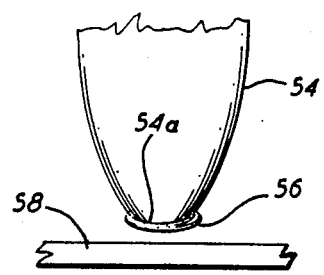
FIG. 4 is a cross-section view of one lenticule showing a reflective coating on its tip portion.

FIG. 4 shows an alternate way of providing an external reflective surface on the lenticular array, simply by selectively coating the tip portions 54a of the lenticules with a layer 56 of a light reflecting material, such as aluminum or silver.

The apparent contrast of images displayed on such front projection screens may be enhanced by applying a light absorbing material, so-called black masking, between the lenticules to reduce reflected ambient light. Black masking is shown in both FIG. 2 and FIG. 3. In FIG. 2, such masking is accomplished by placing a black filament or thread capable of absorbing visible light in the grooves 46 between the lenticules. In FIG. 3, such masking is accomplished by filling a substantial portion of the grooves 46 with discreet black particles 48, and by containing said particles by means of a skin 50 which extends between the lenticular ribs 32 and over the groove 46. Such a black mask construction is described in U.S. Pat. No. 4,605,283, assigned to the same Assignee as the present Application.

Where the reflective means is provided by coating the tips of the lenticules, the absorption means may simply be a sheet (58 in FIG. 4) having a light absorbing surface placed behind the lenticular array. This eliminates the need of providing individual filaments or particles within the grooves themselves, thus improving manufacturability of the screen.

As mentioned above, diffusion means may be employed in such front projection screens in order to increase the vertical distribution of light provided by the projection lenses. This diffusion can be effected by a bulk property of the refracting material from which the screen is constructed, or can be due to surface texturizing of any surface, preferably not the rear lenticular surface, or can be a diffusion layer present in a composite laminate, or can be produced by some combination of these approaches.

As an alternative to diffusion means, a longitudinal lenticular lens array at right angles to the main array may be employed to aid in the distribution of light in the vertical direction. The focal length of the elements of the array should be substantially different from the thickness of the transmissive layer. The array can be on the surface 30a or imbedded in the sheet 30, provided that there is a refractive index change at the array interface to provide for optical power. A practical change in refractive index for this purpose would be 0.1 or greater. Plastics are known which will provide this amount of variation of refractive index, even within one generic class, such as acrylics.

In the event that it is desired to also have a horizontal linear Fresnel lens on surface 30a to provide for vertical control of the mean direction of projected light returned to the audience space, or in conjunction with a horizontally curved screen to compensate for the angle at which projected light strikes the screen, the surface of the facets of the linear Fresnel lens can be curved so that the linear Fresnel lens provides for the dual purpose of spreading light vertically and controlling the direction of incident or projected rays. Such curvature could be cylindrically convex or cylindrically concave.

Front projection screens made in accordance with the present invention can be manufactured by various processes, including compression molding, injection molding, extrusion, hot roller pressing, casting and photo-polymerization processes. Such screens can be constructed of optically transparent or translucent solid materials such as inorganic glasses and a variety of plastics. In addition, the screen composition can also be a mixture of materials. A preferred material is polymethylmethacrylate. The front surface of the screen may be treated with a coating to improve its durability.

Figure 5:
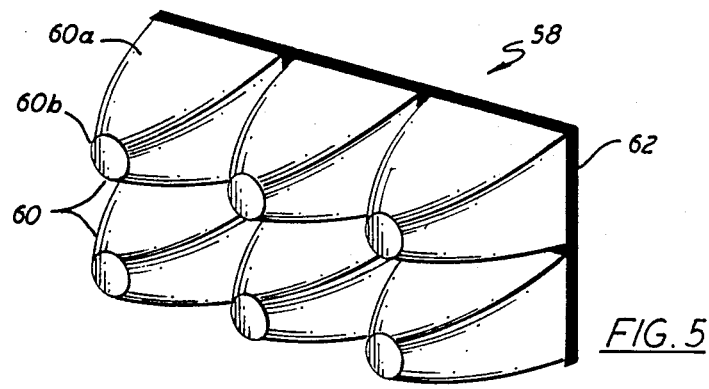
FIG. 5 is a perspective view of another embodiment of the invention in which the lenticules are truncated pyramids.

An important variation of the design of the screen is to replace the longitudinal lenticular array with a two dimensional array of 4-sided truncated pyramids having horizontal and vertical cross-sections corresponding to the cross-section of a linear lenticule. The pyramids need not have square bases, but can have, for example, a narrower pitch in the vertical direction which will result in a narrower distribution of light vertically than horizontally. Such an array 58 is shown in FIG. 5, in which truncated pyramids 60 comprise sides 60a and tips 60b, and black masking 62 is present in the spaces between the pyramids 60 in both the vertical and horizontal directions. Use of the pyramids will result in a greater effective area of black masking and so will improve the contrast of displays viewed in ambient light. This variation will especially improve the absorption of ambient light predominantly directed from above or below.

Figure 6:
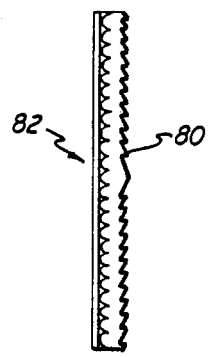
FIG. 6 is a cross-section view of another embodiment of the invention, in which the front surface of the screen comprises a Fresnel lens.

If it is needed, a Fresnel lens 80 can be introduced on the front surface (i.e. the surface observed by the audience) of a one-piece screen 82 shown in FIG. 6. Such a Fresnel lens can be designed to compensate for the change in angle that the projected light makes with the screen normal at different portions of the screen. This is most needed if the projection distance is relatively short or the projection screen is relatively large.

Figure 7:
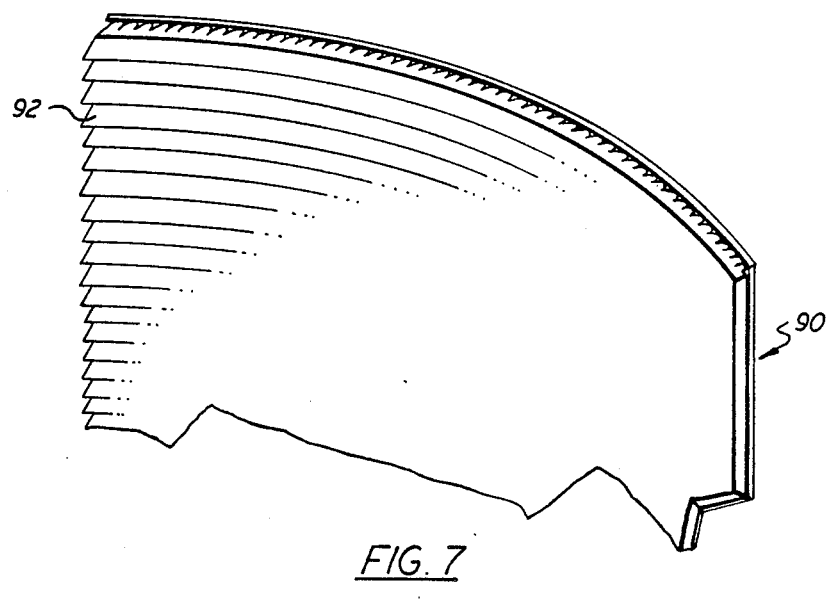
FIG. 7 is a perspective view of still another embodiment of the invention in which the screen is curved in a horizontal direction and the front surface of the screen comprises a horizontally-oriented linear Fresnel lens.

Another method of compensating for the angle at which projected light strikes the screen is to curve the screen concavely as viewed from the audience field. As will be appreciated, curving the screen in one direction and using a linear collimating Fresnel lens in the other direction is advantageous in providing a degree of normally incident light rays otherwise obtainable only by spherically curving the screen, which is often difficult to achieve in practice. Such an arrangement is shown in FIG. 7, in which horizontally oriented linear Fresnel lens 92 is present on the front surface of screen 90, which is curved in the horizontal direction only.

What is claimed is:
1. Front projection screen having:
   a light transmissive layer having a front surface and a rear surface defining a lenticular lens array comprising sequentially adjacent lens elements, each element having a tip portion and sidewall portions, the sidewall portions steeply inclined to direct light from a projection source by total internal reflection to the tip portions;
   external light reflective means adjacent to at least the tip portions for reflecting the directed light back through the screen and into an audience field; and
   light-absorbing means adjacent to at least the sidewall portions for absorbing ambient light.

2. The screen of claim 1 in which the lenticular lens array comprises vertically oriented mutually parallel lenticular lens elements extending the entire vertical length of the screen, each lenticule having two sidewall portions.

3. The screen of claim 1 in which the sidewall portions of the lens elements are convexly curved.

4. The screen of claim 1 in which the external reflective means comprises a layer having a mirrored surface adjacent the rear surface of the array.

5. The screen of claim 4 in which the mirrored surface is optically coupled to the tip portions of the lens elements.

6. The screen of claim 4 in which the light absorbing means comprises black masking in the spaces between adjacent lens elements of the lenticular lens array.

7. The screen of claim 6 in which the black masking comprises black filaments.

8. The screen of claim 6 in which the black masking comprises black particles.

9. The screen of claim 1 in which the external reflective means comprises a coating having a mirrored surface on the tip portions of the lens elements.

10. The screen of claim 9 in which the light absorbing means comprises a layer having a light absorbing surface adjacent the rear surface of the array.

11. The screen of claim 2 in which the lenticular elements have a height to base width ratio of from about 2:1 to 20:1 and a base width to tip width ratio of from about 1:2 to 6:1.

12. The screen of claim 1 in which the front surface has an anti-reflective coating.

13. The screen of claim 1 in which the front surface has an anti-reflective texture.

14. The screen of claim 1 which additionally comprises optical diffusion means.

15. The screen of claim 1 which additionally comprises a Fresnel lens.

16. The screen of claim 15 in which the Fresnel lens is on the front surface of the light transmissive layer.

17. The screen of claim 15 in which the Fresnel lens is embedded in the light transmissive layer.

18. The screen of claim 15 in which the Fresnel lens is circular and the screen is flat.

19. The screen of claim 15 in which the Fresnel lens is linear and oriented in the horizontal direction, and the screen is curved in the horizontal direction.

20. The screen of claim 19 in which the facets are curved in the vertical cross section.

21. The screen of claim 1 which additionally comprises a horizontally oriented lenticular lens array.

22. The screen of claim 21 in which the array is embedded in the light transmissive layer.

23. The screen of claim 1 in which the lenticular lens array comprises vertically and horizontally adjacent lens elements, each element comprising a truncated pyramid having a rectangular base portion, four sidewall portions and a tip portion.

* * * * *